United States Patent
Okumichi et al.

(10) Patent No.: US 8,023,765 B2
(45) Date of Patent: Sep. 20, 2011

(54) BLOCK NOISE REMOVAL DEVICE

(75) Inventors: Kenji Okumichi, Tokyo (JP); Hirofumi Honda, Chuo (JP)

(73) Assignee: Pioneer Corporation, Tokyo (JP)

( * ) Notice: Subject to any disclaimer, the term of this patent is extended or adjusted under 35 U.S.C. 154(b) by 1167 days.

(21) Appl. No.: 11/785,485

(22) Filed: Apr. 18, 2007

(65) Prior Publication Data

US 2007/0242896 A1    Oct. 18, 2007

(30) Foreign Application Priority Data

Apr. 18, 2006    (JP) ................................ 2006-114833

(51) Int. Cl.
*G06K 9/40*    (2006.01)
(52) U.S. Cl. .................... 382/275; 382/162; 382/166
(58) Field of Classification Search .................. 382/162, 382/166, 245, 278; 375/240, 240.01
See application file for complete search history.

(56) References Cited

U.S. PATENT DOCUMENTS

| | | | | |
|---|---|---|---|---|
| 5,134,464 A * | 7/1992 | Basile et al. | ................. | 348/487 |
| 5,799,111 A * | 8/1998 | Guissin | ................. | 382/254 |
| 5,877,819 A * | 3/1999 | Branson | ................. | 348/701 |
| 6,097,838 A * | 8/2000 | Klassen et al. | ................. | 382/167 |
| 6,141,441 A * | 10/2000 | Cass et al. | ................. | 382/166 |
| 6,275,528 B1 * | 8/2001 | Isozaki et al. | ................. | 375/240 |
| 7,575,171 B2 * | 8/2009 | Lev | ................. | 235/470 |
| 7,680,355 B2 * | 3/2010 | Chiu et al. | ................. | 382/266 |
| 2002/0093595 A1 * | 7/2002 | Sugiyama et al. | ................. | 348/683 |
| 2002/0131642 A1 * | 9/2002 | Lee et al. | ................. | 382/220 |
| 2004/0120597 A1 * | 6/2004 | Le Dinh | ................. | 382/261 |
| 2004/0141645 A1 * | 7/2004 | Lee et al. | ................. | 382/182 |
| 2005/0114894 A1 * | 5/2005 | Hoerl | ................. | 725/74 |

FOREIGN PATENT DOCUMENTS

JP            2000-50275 A        2/2000

* cited by examiner

*Primary Examiner* — Wesley Tucker
*Assistant Examiner* — Aklilu k Woldemariam
(74) *Attorney, Agent, or Firm* — Sughrue Mion, PLLC

(57) ABSTRACT

A block noise removal device classifies interpixel differential values by using a block size N of the decoded video signal. The block noise removal device accumulates the interpixel differential values in the pixels disposed in the nth position. The results of the accumulation provide first to Nth block noise values. A block boundary position signal is produced that represents the pixel position in the pixel group that corresponds with the largest block noise value. The larger of two block noise values of the adjacent pixels on both sides of the pixel having the largest block noise value is taken as the phase error block noise value. A phase error signal is generated on the basis of the ratio between the phase error block noise value and the largest block noise value, block noise removal processing is effected, and the phase correction pixel sample value is obtained.

8 Claims, 10 Drawing Sheets

FIG. 4

| L1 | L2 | L3 | ... | L31 | L32 | L1 | L2 | L3 | ... | L31 | L32 | L1 | L2 | L3 | ... | L31 | L32 |
|----|----|----|-----|-----|-----|----|----|----|-----|-----|-----|----|----|----|-----|-----|-----|
| G1 | G2 | G3 | ... | G31 | G32 | G33 | G34 | G35 | ... | G63 | G64 | G65 | G66 | G67 | ... | G95 | G96 |

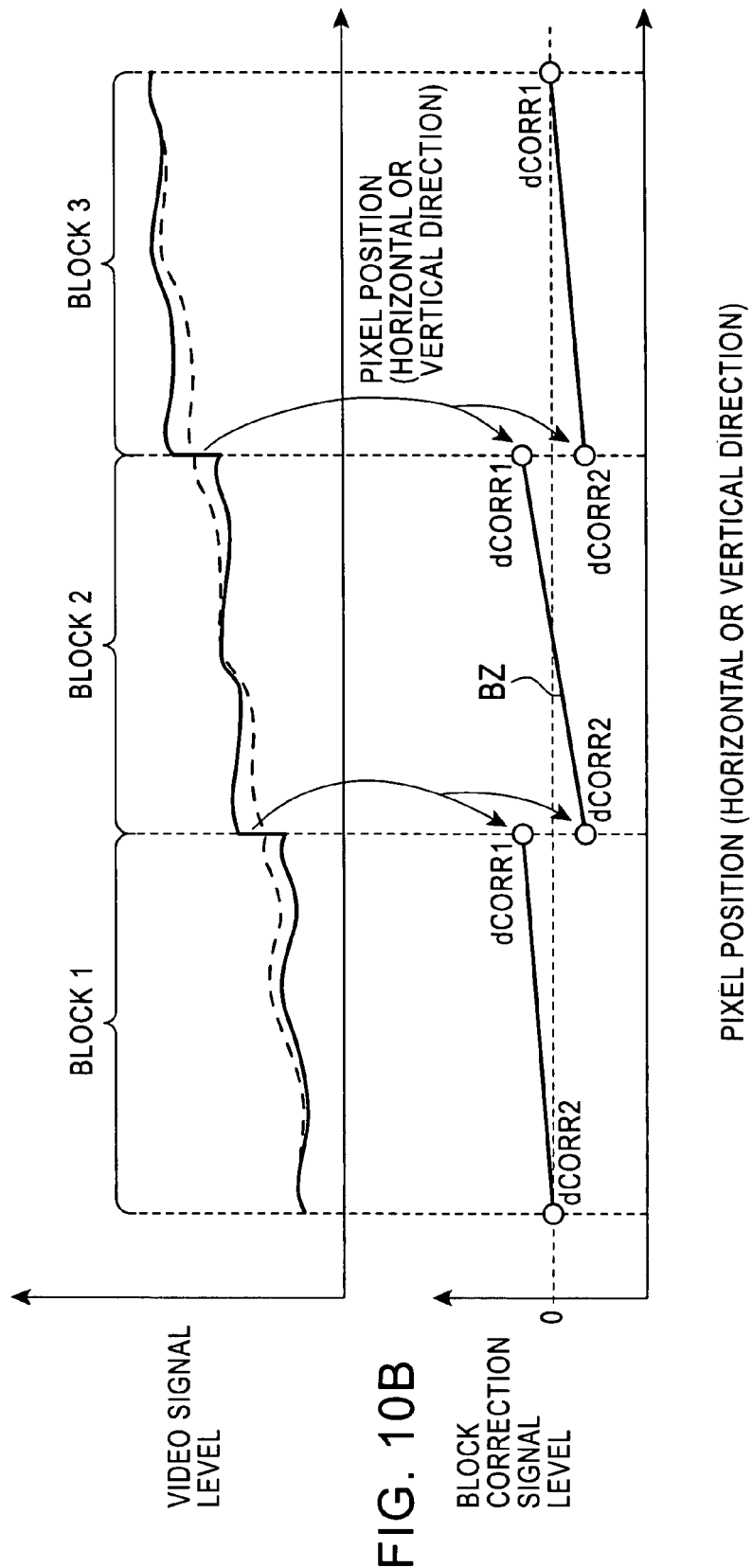

BLOCK NOISE REMOVAL DEVICE

BACKGROUND OF THE INVENTION

1. Field of the Invention

The present invention relates to a block noise removal device for removing block noise that is produced when decoding information data produced as a result of performing compression-coding the information data on each of a plurality of blocks.

2. Description of the Related Art

Compression-coding, which adopts the MPEG (Moving Picture Expert Group) system, is implemented in order to reduce an amount of information when transmitting and/or recording video or speech signals or the like. In such MPEG encoding processing, compression of the information amount is effected by performing quantization processing after performing conversion to produce a DCT coefficient for each frequency region. The DCT coefficient is by performing a Discrete Cosine Transformation (called 'DCT' hereinbelow) for each two-dimensional unit block of the video signal. The larger the quantization step used in the quantization processing, the larger the compression rate. However, quantization noise is produced as a result of some values being discarded. Block noise is a typical example of such quantization noise. In other words, because various processing is performed on each two-dimensional unit block as mentioned above in the MPEG encoding processing, the boundary of the block become evidence when the two-dimensional unit blocks are decoded. For the video signal, compression of a brightness signal or color difference signal is the norm but various signal formats such as an RGB signal may be considered.

Therefore, a method for detecting such block noise in a video signal that has undergone MPEG decoding and removing the block noise has been proposed. One example of such methods is disclosed in Japanese Patent Application Kokai (Laid Open) No. 2000-50275. With this block noise removal method, the difference between adjacent pixels in a horizontal direction is first obtained for a video signal that has undergone MPEG decoding. When the differential value is greater than a predetermined threshold value, it is determined that the corresponding point is the block boundary (See FIGS. 3A to 3C of Japanese Patent Application Kokai No. 2000-50275). By performing filtering processing on the block boundary portion, a block noise reduction is implemented by smoothing a sharp level change between adjacent blocks which constitutes the origin of the block noise.

With respect to a video signal that represents a picture such that the level of the video signal increases (or decreases) gradually in a horizontal direction within each block as shown in FIG. 1 of the accompanying drawings, the difference between adjacent pixels is always a fixed value other than zero. Therefore, there has been the risk that this difference will be erroneously judged as being the block boundary BB.

Because the block boundary in a video signal whose resolution has been resized or in a video signal that has undergone analog conversion fades after MPEG decoding, the block boundary cannot be accurately detected.

SUMMARY OF THE INVENTION

One object of the present invention is to provide a block noise removal device that permits the removal of noise at the block boundary portion without degrading the image quality even if an input video signal has been converted to an analog signal or resized after performing compression-coding and decoding the input video signal for each two-dimensional pixel block units.

According to a first aspect of the present invention, there is provided a block noise removal device for removing block noise from within a decoded video signal obtained by encoding and decoding an input video signal for each pixel block. Each pixel block has a plurality of pixels. The block noise removal device includes an interpixel differential value calculator for calculating, as an interpixel differential value, a differential value between each two adjacent pixels in the decoded video signal. The block noise removal device also includes an accumulation unit for classifying, into separate pixel groups, the interpixel differential values by using a block size N (where N is an integer) of the decoded video signal or by using M which is an integer multiple of the block size N. The accumulation unit accumulates the interpixel differential values of the pixels disposed in the respective nth position (where n is 1 to N or 1 to M) in the respective pixel groups, thereby obtaining first to Nth block noise values or first to Mth block noise values. The block noise removal device also includes a block boundary detector for detecting the largest block noise value among the first to Nth block noise values or the first to Mth block noise values to generate a block boundary position signal. The block boundary position signal indicates the pixel position having the largest block noise value in the pixel group. The block boundary detector detects, as a phase error block noise value, the larger of the block noise values of the adjacent pixels on both sides of the pixel having the largest block noise value, so as to generate a phase error signal on the basis of a ratio between the phase error block noise value and the largest block noise value. The block noise removal device also includes a phase correction unit for obtaining a phase correction pixel sample value. The phase correction pixel sample value is produced by performing phase correction processing based on the phase error signal on the decoded video signal. The block noise removal device also includes a signal generator for generating a noise-removed video signal by performing block noise removal processing on the basis of the phase correction pixel sample value.

According to a second aspect of the present invention, there is provided another block noise removal device for removing block noise from within a decoded video signal obtained by encoding and decoding an input video signal for each pixel block having a plurality of pixels. This block noise removal device includes an interpixel differential value calculator for calculating, as an interpixel differential value, a differential value between each two adjacent pixels in the decoded video signal. The block noise removal device also includes an accumulation unit for classifying, into separate pixel groups, the interpixel differential values by using M which is an integer multiple of a block size N (where N is an integer) of the decoded video signal and a resized block size L estimated from the decoded video signal. The accumulation unit accumulates the interpixel differential values of the pixels disposed in the respective nth position (where n is 1 to M) in the respective pixel groups, thereby obtaining first to Mth block noise values. The block noise removal device also includes a cycle judgment unit for determining whether the cycle of the consecutive first to Mth block noise values is N or L. The block noise removal device also includes a block boundary detector for detecting the largest block noise value among the first to Nth block noise values or the first to Mth block noise values to generate a block boundary position signal. The block boundary position signal indicates the pixel position having the largest block noise value in the pixel group. The block boundary detector detects, as a phase error block noise value, the larger of the block noise values of the adjacent pixels on both sides of the pixel having the largest block noise value, so as to generate a phase error signal on the basis of a ratio between the phase error block noise value and the largest block noise value. The block noise removal device also includes a phase correction unit for obtaining a phase correction pixel sample value. The phase correction pixel sample value is produced by performing phase correction processing based on the phase error signal on the decoded video signal. The block noise removal device also includes a signal generator for generating a noise-removed video signal by performing block noise removal processing on the basis of the phase correction pixel sample value and the cycle detected by the cycle judgment unit.

According to a third aspect of the present invention, there is provided another block noise removal device that removes block noise from within a decoded video signal of N (horizontal direction) pixels×N (vertical direction) pixels. The decoded video signal is obtained by encoding and decoding an input video signal for each pixel block having a plurality of pixels. The block noise removal device may also remove block noise from within a resized decoded video signal. The resized decoded video signal is obtained by resizing resolution of the decoded video signal using a factor of Q. The block noise removal device includes an interpixel differential value calculator for calculating, as an interpixel differential value, a differential value between each two adjacent pixels in the decoded video signal or the resized decoded video signal. The block noise removal device also includes an accumulation unit for classifying pixels of one screen into separate pixel groups. Each pixel group has M continuous pixels in a horizontal direction or a vertical direction. M is a common multiple of N·Q and N. The accumulation unit accumulates the unit block noise values of the pixels disposed in the respective nth position (where n is 1 to M) in the respective pixel groups, thereby obtaining first to Mth block noise values. The block noise removal device also includes a convolution unit for cyclically (or repeatedly) allocating first to Nth labels to the first to Mth block noise values in order of the first to Mth block noise values. M is greater than N. The convolution unit accumulates the block noise values to which a particular label has been allocated. This accumulation is performed for each of the first to Nth labels, thereby obtaining first to Nth convolution block noise values. The block noise removal device also includes a first block boundary detector for detecting the largest convolution block noise value among the first to Nth convolution block noise values to generate a first block boundary position signal. The first block boundary position signal indicates the pixel position having the largest convolution block noise value. The first block boundary detector detects, as a phase error convolution block noise value, the larger of the convolution block noise values of the adjacent pixels on both sides of the pixel having the largest convolution block noise value to generate a first phase error signal on the basis of a ratio between the phase error convolution block noise value and the largest convolution block noise value. The block noise removal device also includes a second block boundary detector for detecting the largest block noise value among the first to Mth block noise values to generate a second block boundary position signal. The second block boundary position signal indicates the pixel position having the largest block noise value. The second block boundary detector detects, as a phase error block noise value, the larger of the block noise values of the adjacent pixels on both sides of the pixel having the largest block noise value to generate a second phase error signal on the basis of a ratio between the phase error block noise value and the largest block noise value. The block noise removal device also includes a selector for selecting either the first phase error signal or the second phase error signal to issue the selected phase error signal as a phase error signal. The selector also selects either the first block boundary position signal or the second block boundary position signal to issue the selected block boundary position signal as a block boundary position signal. The block noise removal device also includes a signal generator for generating a noise-removed video signal by performing block noise removal processing on the basis of the block boundary position signal on the decoded video signal or the resized decoded video signal after performing phase correction processing on the basis of the phase error signal on the decoded video signal or the resized decoded video signal.

The block noise removal device classifies, into separate pixel groups, interpixel differential values by using a block size N (where N is an integer) of the decoded video signal or by using M which is an integer multiple of the block size N. The block noise removal device accumulates the interpixel differential value in the pixel disposed in the nth position (where n:1 to N or 1 to M) in each of the pixel groups. This accumulation is performed for each of the first to Nth positions or the first to Mth positions in all the pixel groups. The results of the accumulation provide first to Nth block noise values or first to Mth block noise values. Then, the largest block noise value among the first to Nth block noise values or the first to Mth block noise values is found. A block boundary position signal is produced that represents, as a block boundary position, the pixel position in the pixel group that corresponds with the largest block noise value. The larger of two block noise values of the adjacent pixels on both sides of the pixel having the largest block noise value is taken as the phase error block noise value. A phase error signal is then generated on the basis of the ratio between the phase error block noise value and the largest block noise value. Block noise removal processing is effected on the basis of a phase correction pixel sample value. The phase correction pixel sample value is obtained by performing phase correction processing based on the phase error signal on the decoded video signal.

It is possible to remove block noise reliably without degrading the display quality even if an input video signal has a large level difference between adjacent blocks or an input video signal has resolution resized after decoding.

BRIEF DESCRIPTION OF THE DRAWINGS

FIG. 4 shows an example of 32 pixel position labels that are allocated to the respective pixel positions of 32 consecutive pixels;

FIG. 10A and FIG. 10B depict the operation of an inter-boundary correction value interpolation circuit shown in FIG. 8.

DETAILED DESCRIPTION OF THE INVENTION

One embodiment of the present invention will be described hereinbelow with reference to the drawings.

Figure 1:
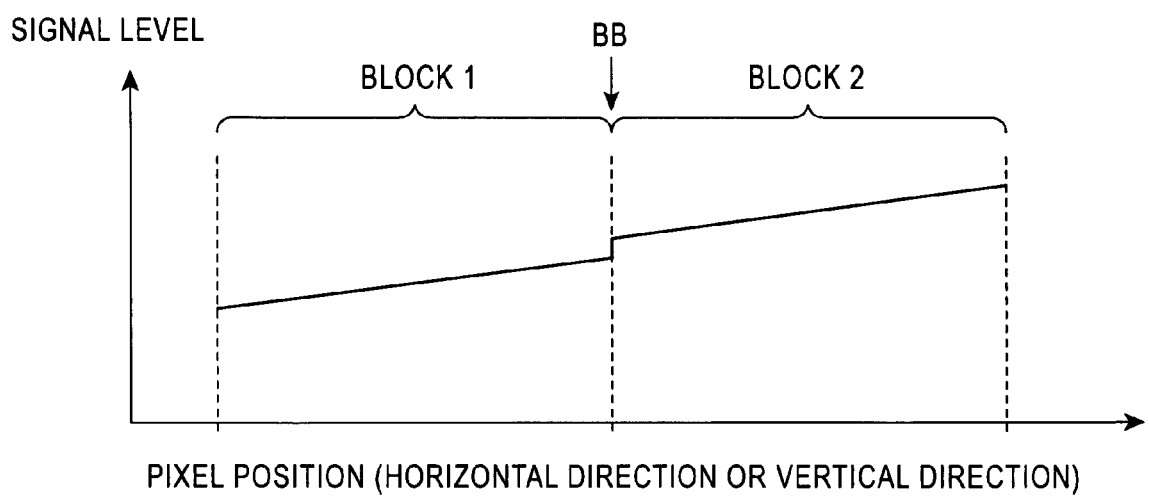
FIG. 1 shows an example of a video signal that represents a picture whose signal level increases gradually in a horizontal direction within each block.
Figure 2:
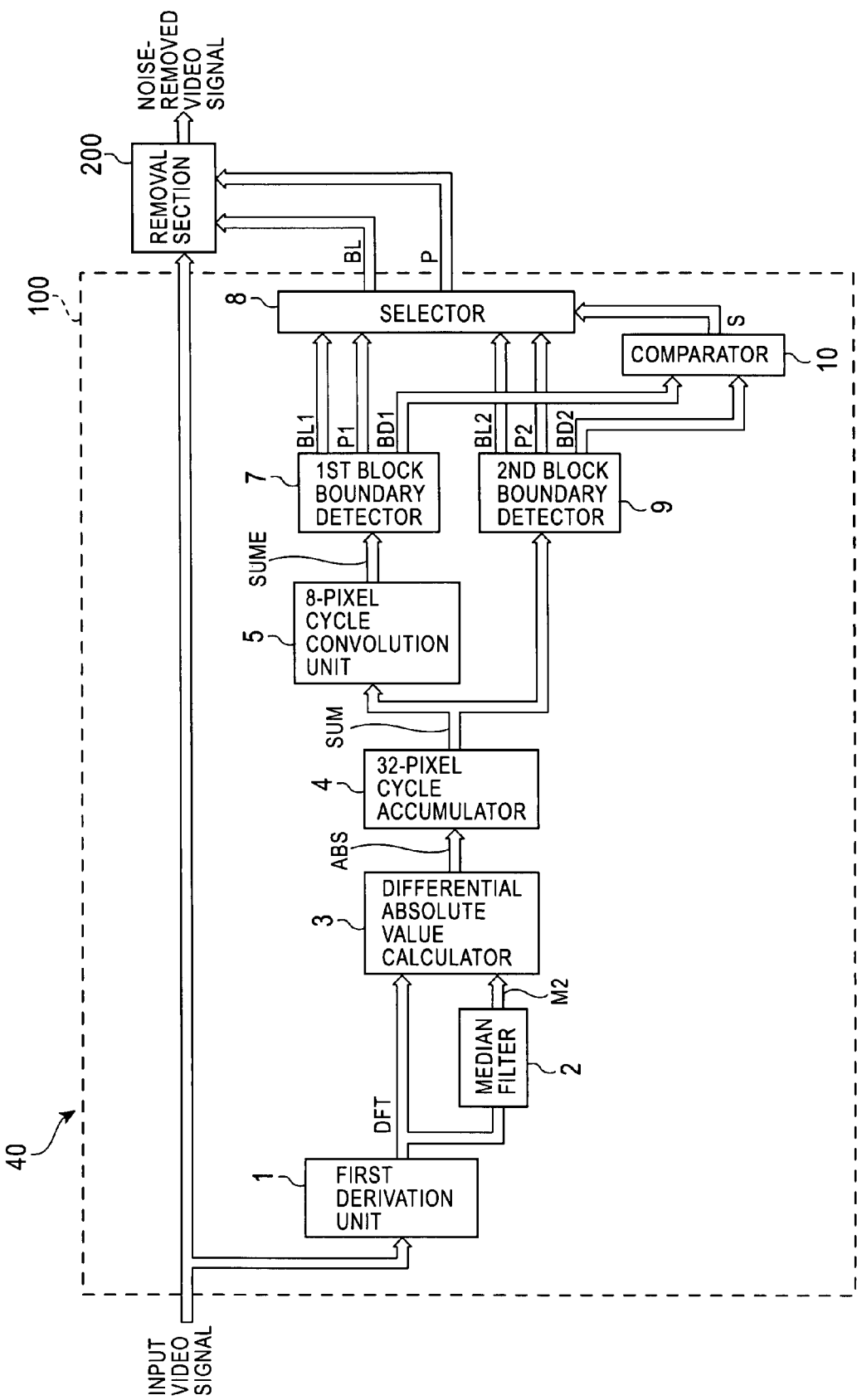
FIG. 2 is a block diagram of a block noise removal device according to one embodiment of the present invention.

As shown in FIG. 2, the block noise removal device 40 of this embodiment includes a detection section 100 and a removal section 200. The detection section 100 detects block noise from within an input video signal and the removal section 200 removes block noise that is produced in the input video signal in accordance with the block noise detection result.

The detection section 100 includes a first derivation circuit 1, a median filter 2, a differential absolute value calculation circuit 3, a 32-pixel cycle accumulation circuit 4, an 8-pixel cycle convolution circuit 5, a first block boundary detection circuit 7, a selector 8, a second block boundary detection circuit 9, and a comparator 10.

The first derivation circuit 1 calculates the differential values of adjacent pixels, as interpixel differential values, with respect to the signal levels corresponding with the respective pixels in the input video signal and supplies a series of interpixel differential values DFT to the median filter 2 and to the differential absolute value calculation circuit 3.

The input video signal is a signal that is obtained by MPEG-decoding a video signal obtained as a result of the MPEG encoder performing compression-coding on each two-dimensional pixel block of 8 pixels (horizontal direction)×8 pixels (vertical direction). A brightness signal is compression-coded for each pixel block having 8 pixels (horizontal direction)×8 pixels (vertical direction) and then decoded to render a decoded signal of 8 pixels (horizontal direction)×8 pixels (vertical direction). The color difference signal is handled as a signal amount which is ¼ that of the brightness signal, and therefore, the color difference signal is compression-coded for each pixel block having 8 pixels (horizontal direction)×8 pixels (vertical direction) and decoded to produce a decoded signal of 16 pixels (horizontal direction)×16 pixels (vertical direction). The resolutions of the input video signal include various values such as [720×480 pixels], [1440×1080 pixels], and [1920×1080 pixels] and resolution conversion is sometimes performed in accordance with the resolution of the display device on the tuner side after the MPEG decoding. This is known as re-sizing. In this specification, the input video signal is a video signal whose resolution after MPEG decoding is '1440×1080 pixels' or a resized video signal whose resolution in the horizontal direction is resized to 1.33 times (i.e., 1920×1080 pixels) after MPEG decoding. 1440×1.33≈1920. It should be noted that the actual resolution levels of the input video signal include various levels as mentioned above and therefore various resizing may be considered in the future.

The median filter 2 performs statistical processing to obtain a center value M2 from among three interpixel difference values that are consecutive in the interpixel differential value series DFT (or every other three interpixel differential values). The median filter 2 supplies the center value M2 to the differential absolute value calculation circuit 3.

The differential absolute value calculation circuit 3 calculates an absolute value of the difference between each interpixel differential value in the interpixel differential value series DFT and the center value M2 and takes it as a unit block noise value ABS. The differential absolute value calculation circuit 3 supplies the unit block noise values ABS to the 32-pixel cycle accumulation circuit 4.

The operation of the first derivation circuit 1, median filter 2 and differential absolute value calculation circuit 3 will be described below with reference to FIGS. 3A to 3C.

Figure 3A:
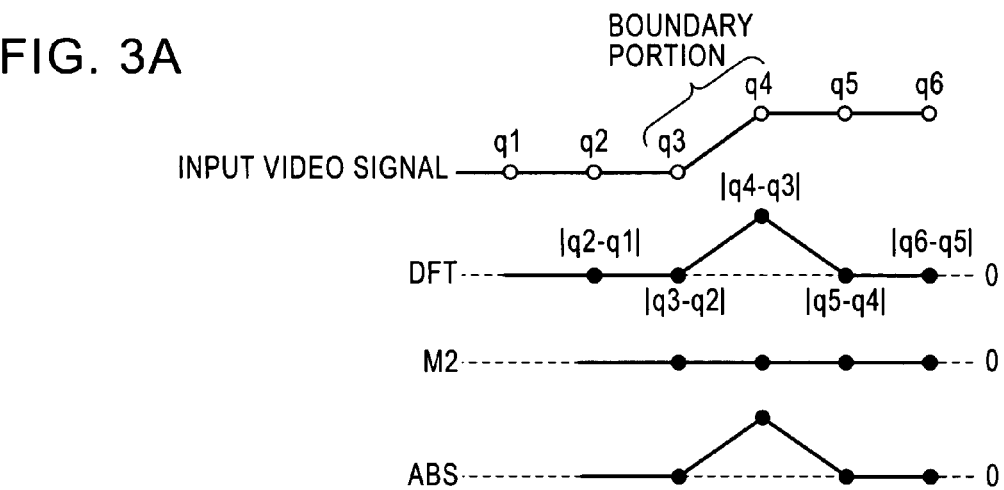
FIG. 3A to FIG. 3C illustrate the operation of a first-order derivation circuit, median filter, and differential absolute value calculation circuit of the block noise removal device shown in FIG. 2.

FIG. 3A shows an example of the input video signal in a case where a block boundary exists. FIG. 3A also shows an interpixel differential value series DFT, a center value M2 and unit block noise value ABS of this input video signal.

In the case of the input video signal shown in FIG. 3A, the interpixel differential value series DFT takes a value other than zero at only one point (i.e., the block boundary portion) and takes a value "zero" elsewhere. Hence, in this input video signal, the center value M2 for the three consecutive interpixel differential values in the interpixel differential value series DFT is always zero. Accordingly, the absolute value of the difference between each interpixel differential value in the interpixel differential value series DFT and the center value M2, that is, the unit block noise value ABS, takes a value other than zero only at the block boundary.

Figure 3B:
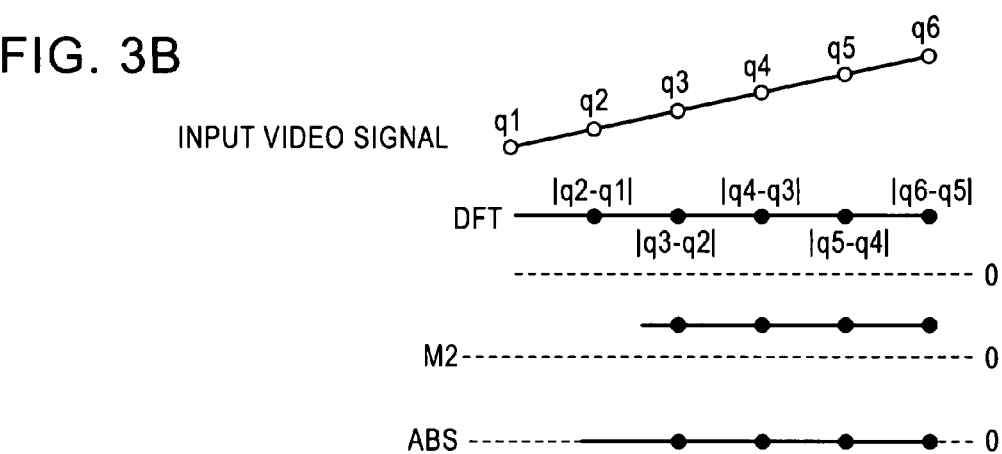

FIG. 3B shows an example of an input video signal when the block boundary does not exist and the signal level of the input video signal is gradually increasing. FIG. 3B also shows the interpixel differential value series DFT, the center value M2, and unit block noise value ABS of this input video signal.

In the case of the input video signal whose signal level changes in the form of a slope as shown in FIG. 3B, the interpixel differential value series DFT always takes values other than zero. In this situation, the center values of each three consecutive interpixel differential values in the interpixel differential value series DFT are the same as the respective interpixel differential values in the interpixel differential value series DFT. Accordingly, the absolute value of the difference between the interpixel differential value series DFT and the center value M2, that is, the unit block noise value ABS, is zero. Therefore, even when an input video signal having a slope-like level change is supplied, the slope portion is not erroneously judged as the block boundary portion and a unit block noise value ABS is obtained accurately.

Figure 3C:
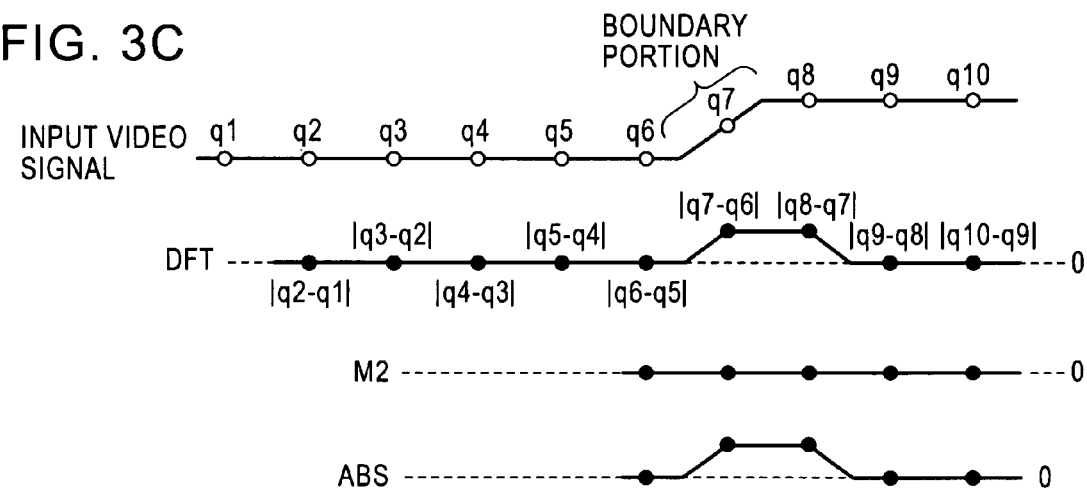

FIG. 3C illustrates an input video signal that is converted to an analog signal or resized. The input video signal includes a block boundary. FIG. 3C also illustrates an interpixel differential value series DFT, center value M2, and unit block noise value ABS of this input video signal.

As shown in FIG. 3C, the input video signal that has been converted to analog or resized sometimes has the smoothed block boundary portion, that is, a faded (blurred) portion. With respect to such an input video signal, the median filter 2 extracts every other three interpixel differential values from among the interpixel differential value series DFT and performs statistical processing to obtain the center value M2 from among these three interpixel differential values. The median filter 2 supplies the center value M2 to the differential absolute value calculation circuit 3. Accordingly, even if an input video signal has the blurred block boundary portion as a result of being converted to an analog signal or resized, a unit block noise value ABS with a value other than zero only in the block boundary portion can be generated as shown in FIG. 3C.

The 32-pixel cycle accumulation circuit 4 executes the following cumulative addition calculation processing on the basis of this unit block noise value ABS.

The 32-pixel cycle accumulation circuit 4 first partitions the respective pixels G of one frame of the display device (not shown) into pixel groups (surrounded by a black solid line) each having 32 pixels adjacent to one another in a horizontal direction (or the vertical direction) as shown in FIG. 4. Within each respective pixel group, the 32-pixel cycle accumulation circuit 4 allocates the pixel position labels L1 to L32 in correspondence with the 32 pixel positions in the pixel group. Subsequently, the 32-pixel cycle accumulation circuit 4 accumulates for one screen the unit block noise values ABS of the pixels disposed in the pixel positions indicated by the pixel position label L concerned. This accumulation is performed for each of the 32 pixel position labels L. The 32-pixel cycle accumulation circuit 4 obtains the accumulation result for each of the pixel position labels L1 to L32 as the block noise value SUM1 to SUM32.

If the input video signal is obtained by compression-coding and decoding a video signal block by block (each block consisting of 8 pixels (horizontal direction)×8 pixels (vertical direction)), block noise appears every 8-pixel cycles. However, if an input video signal is produced by resizing the resolution in the horizontal direction of a video signal (which is obtained by compression-coding and decoding an analog video signal block by block) from a resolution of 1440 pixels to a resolution 1.33 times the former resolution, i.e., 1920 pixels, block noise appears every (8×1.33)-pixel cycles, that is, every approximately 10.67-pixel cycles. The original resolution of the video signal is 1400×1080 pixels.

Therefore, in the 32-pixel cycle accumulation circuit 4, the block noise values SUM1 to SUM32 are obtained by accumulating unit block noise values ABS every 32-pixel cycles which is the smallest common multiple of 8 pixels and 8×1.33 pixels in order to be able to detect the block boundary position which is the cause of the block noise with respect to both a video signal which has not been resized and a resized video signal whose resolution has been resized to 1.33 times the initial resolution. In short, in the 32-pixel cycle accumulation circuit 4, first to Mth block noise values (SUM1 to SUM32) are obtained by accumulating unit block noise values every M-pixel cycles which is the smallest common multiplier between N and N·Q with respect to both a video signal that is obtained by encoding and decoding for each two-dimensional pixel block having N×N pixels and a resized video signal whose resolution has been resized to a resolution that is Q times the former resolution.

Figure 5:
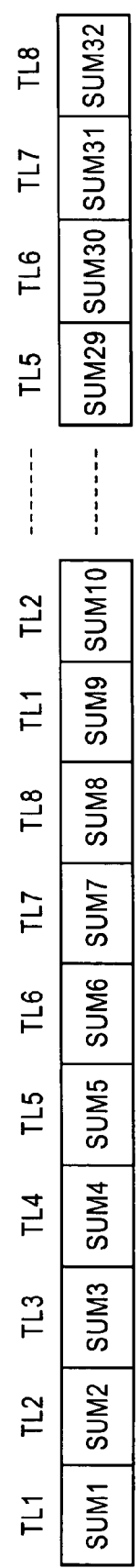
FIG. 5 shows an example of eight pixel position labels that are newly allocated to the 32 block noise values.

The 8-pixel cycle convolution circuit 5 cyclically (or repeatedly) allocates pixel position labels TL1 to TL8 in the order TL1 to TL8 to the block noise values SUM1 to SUM32 as shown in FIG. 5. The 8-pixel cycle convolution circuit 5 accumulates the block noise values SUM to which a particular pixel position label TL has been allocated. This accumulation is performed for each of the eight pixel position labels TL1 to TL8. The 8-pixel cycle convolution circuit 5 supplies the accumulation result of each of the pixel position labels TL1 to TL8 to the first block boundary detection circuit 7 as new block noise values SUME1 to SUME8.

The first block boundary detection circuit 7 first finds the largest among the block noise values SUME1 to SUME8 and takes this largest block noise value as the maximum block noise value $SUME_{MAX}$. Then, the first block boundary detection circuit 7 takes the larger of the two block noise values SUME of the adjacent pixel position labels TL on both sides of the pixel position label TL which is allocated to the maximum block noise value $SUME_{MAX}$ as the phase error block noise value $SUME_{FE}$. The first block boundary detection circuit 7 calculates the difference between the maximum block noise value $SUME_{MAX}$ and the largest among the block noise values SUME1 to SUME8, except for the maximum block noise value $SUME_{MAX}$ and the phase error block noise value $SUME_{FE}$, and supplies the difference to the comparator 10 as a non-resized boundary judgment value BD1. Then, the first block boundary detection circuit 7 determines whether the non-resized boundary judgment value BD1 is larger than a predetermined threshold value S1. When it is determined that the non-resized boundary judgment value BD1 is larger than the predetermined threshold value S1, the first block boundary detection circuit 7 judges that the respective pixel positions every 8 pixel cycles, with the pixel position indicated by the pixel position label TL having the maximum block noise value $SUME_{MAX}$ serving as a reference, are the block boundary positions and supplies the block boundary position signal BL1 representing the block boundary positions to the selector 8. Then, the first block boundary detection circuit 7 generates the phase error signal P1 which has a polarity that is decided by the direction of the pixel position label TL of the phase error block noise value $SUME_{FE}$ with respect to the pixel position label TL of the maximum block noise value $SUME_{MAX}$. The phase error signal P1 has a value that is decided by the ratio of the phase error block noise value $SUME_{FE}$ to the maximum block noise value $SUME_{MAX}$. The first block boundary detection circuit 7 supplies the phase error signal P1 to the selector 8.

The pixel position having the maximum block noise value $SUME_{MAX}$ is taken as $TL_{MAX}$ and the pixel position having the phase error block noise value $SUME_{FE}$ is taken as $TL_{FE}$. The adjacent pixel position changes one unit (one pixel position) at a time. The operation in a case where the pixel position $TL_{MAX}$ is located on the left side of the pixel position $TL_{FE}$ and the operation in a case where the pixel position $TL_{MAX}$ is located on the right side of the pixel position $TL_{FE}$ will be described with reference to FIGS. 6A and 6B, respectively.

Figure 6A:
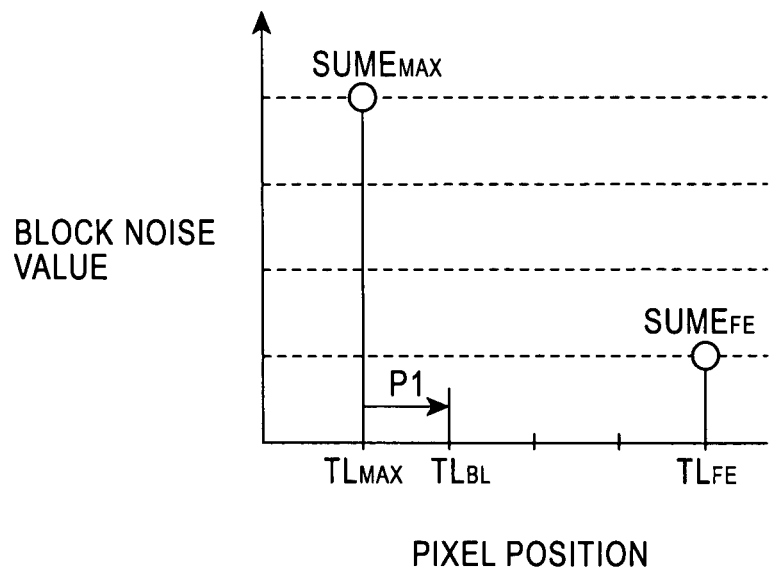
FIG. 6A illustrates the operation when obtaining a phase error signal.

(A) When the pixel position $TL_{MAX}$ is located on the left side of the pixel position $TL_{FE}$ When the pixel position $TL_{MAX}$ is located on the '−' side of the pixel position $TL_{FE}$, that is, when the pixel position $TL_{MAX}$ is located on the left side of the pixel position $TL_{FE}$, as shown in FIG. 6A, the block boundary position BL1 is taken as a pixel position $TL_{MAX}$. The block noise position $TL_{BL}$ is between the pixel positions $TL_{MAX}$ and $TL_{FE}$ and decided by the ratio between the maximum block noise value $SUME_{MAX}$ and the phase error block noise value $SUME_{FE}$. The amount (distance) of displacement from the block boundary position BL1 to the '+' side, that is, to the right in FIG. 6A is taken as the phase error signal P1 which represents the phase error. The phase error signal P1 is given by the Equation (1):

$$P1 = SUME_{FE}/(SUME_{MAX} + SUME_{FE}) \qquad \text{Equation (1)}$$

Here, $0 \leq P < 0.5$.

This is because if P is 0.5 or more, $SUME_{MAX} < SUME_{FE}$ holds true from the Equation (1), which is inconsistent with the definition.

Figure 6B:
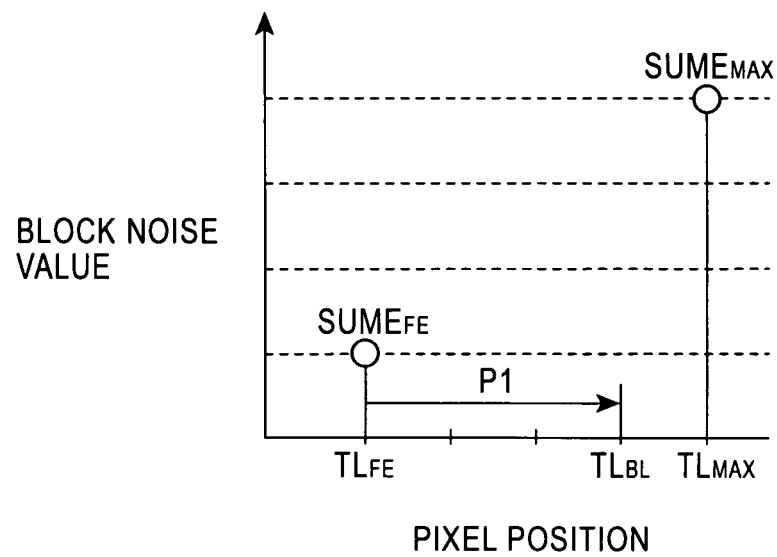
FIG. 6B illustrates another operation when obtaining the phase error signal.

(B) When the pixel position $TL_{MAX}$ is located on the right of the pixel position $TL_{FE}$ When the pixel position $TL_{MAX}$ is located on the '+' side of the pixel position $TL_{FE}$, that is, on the right side of the pixel position $TL_{FE}$, as shown in FIG. 6B, the block boundary position BL1 is taken as a pixel position $TL_{FE}$. The block noise position $TL_{BL}$ is between the pixel positions $TL_{MAX}$ and $TL_{FE}$ and decided by the ratio between the maximum block noise value $SUME_{MAX}$ and the phase error block noise value $SUME_{FE}$. The amount of displacement from the block boundary position BL1 to the '+' side, that is, to the right in FIG. 6B is the phase error signal P1 which represents the phase error. The phase error signal P1 is given by the Equation (2):

$$P1 = SUME_{MAX}/(SUME_{MAX} + SUME_{FE}) \quad \text{Equation (2)}$$

Here, $0.5 < P1 < 1$.

This is because if P1 is no more than 0.5, $SUME_{MAX} \leq SUME_{FE}$ holds true from the Equation (2), which is inconsistent with the definition.

The positioning of the block boundary position BL1, which serves as a reference for the phase error signal P1, in a position on the '−' side, that is, the left one of the pixel position $TL_{MAX}$ and pixel position $TL_{FE}$ is entirely for the purpose of simple calculation. The block noise position $TL_{BL}$ for which the phase error signal P1 is considered is given by the following equation.

$$TL_{BL} = (TL_{MAX} \cdot SUME_{MAX} + TL_{FE} \cdot SUME_{FE})/(SUME_{MAX} + SUME_{FE}) \quad \text{Equation (3)}$$

If it is determined that the non-resized boundary judgment value BD1 is smaller than the predetermined threshold value S1, the first block boundary detection circuit 7 determines that a block boundary does not exist and BD1 becomes zero. The first block boundary detection circuit 7 supplies this BD1 to the comparator 10.

The second block boundary detection circuit 9 first finds the maximum block noise value SUM from among the block noise values SUM1 to SUM32 and takes the maximum block noise value SUM as the maximum block noise value $SUM_{MAX}$. Then, the second block boundary detection circuit 9 takes the larger of the block noise values SUM of the adjacent pixel position labels L on both sides of the pixel position label L which is allocated to the maximum block noise value SUM as the phase error block noise value $SUM_{FE}$. The second block boundary detection circuit 9 detects the second largest block noise value for a position that is one resized block size away from the position of the maximum block noise value $SUM_{MAX}$, that is, 10 or 11 pixels away therefrom, and detects the third largest block noise value for a position that is two block sizes away from the position of the maximum block noise value $SUM_{MAX}$, that is, 21 or 22 pixels away therefrom. The second block boundary detection circuit 9 takes these second and third largest block noise values as the second maximum block noise value $SUM_{MAX2}$ and third maximum block noise value $SUMMAX_3$ respectively. The larger of the block noise values SUM of the adjacent pixel positions labels L on both sides of the pixel position label L allocated to the second largest block noise value is taken as the second phase error block noise value $SUM_{FE2}$, and the larger of the block noise values SUM of the adjacent pixel positions labels L on both sides of the pixel position label L allocated to the third largest block noise value is taken as the third phase error block noise value $SUM_{FE3}$. The second block boundary detection circuit 9 calculates the difference between the maximum block noise value $SUM_{MAX}$ and the largest of the block noise values SUM1 to SUM32 except for the maximum block noise value $SUM_{MAX}$, second maximum block noise value $SUM_{MAX2}$, third maximum block noise value $SUM_{MAX3}$, phase error block noise value $SUM_{FE}$, second phase error block noise value $SUM_{FE2}$ and third phase error block noise value $SUM_{FE3}$, and supplies this difference to the comparator 10 as a resized boundary judgment value BD2. The second block boundary detection circuit 9 determines whether the resized boundary judgment value BD2 is greater than a threshold value S2. When it is determined that the resized boundary judgment value BD2 is greater than the threshold value S2, the second block boundary detection circuit 9 judges that the respective pixel positions of every 10.67-pixel cycles for which the pixel position indicated by the pixel position label L having the maximum block noise value $SUM_{MAX}$ is taken as a reference are block boundary positions and supplies the block boundary position signal BL2 indicating the block boundary positions to the selector 8. Then, the second block boundary detection circuit 9 generates a phase error signal P2 which has a polarity decided by the direction of the pixel position label L of the phase error block noise value $SUM_{FE}$ with respect to the pixel position label L of the maximum block noise value $SUM_{MAX}$. The phase error signal P2 possesses a value that is decided by the ratio of the phase error block noise value $SUM_{FE}$ to the maximum block noise value $SUM_{MAX}$. The second block boundary detection circuit 9 supplies the phase error signal P2 to the selector 8. The method of calculating the block boundary position signal BL2 will be described below. This method is similar to that for the block boundary position signal BL1.

The pixel position of the maximum block noise value $SUM_{MAX}$ is taken as $T_{MAX}$ and the pixel position of the phase error block noise value $SUM_{FE}$ is taken as $T_{FE}$. When the pixel position $T_{MAX}$ is on the '−' side of the pixel position $T_{FE}$, that is, on the left side, the block boundary position BL2 is assumed to be the pixel position $T_{MAX}$. The block noise position $T_{BL}$ is between the pixel position $T_{MAX}$ and pixel position $TL_{FE}$ and decided by the ratio between the maximum block noise value SUM and the phase error block noise value $SUM_{FE}$. The distance from the block boundary position BL2 to the '+' side, that is, to the right is given by the following equation (4) and is taken as the phase error signal P2.

$$P2 = SUM_{FE}/(SUM_{MAX} + SUM_{FE}) \quad \text{Equation (4)}$$

When the pixel position $T_{MAX}$ is located on the '+' side, that is, on the right side of the pixel position $T_{FE}$, the block boundary position BL2 is assumed to be the pixel position $T_{FE}$. The block noise position $T_{BL}$ is between the pixel position $T_{MAX}$ and pixel position $T_{FE}$ and is decided in accordance with the ratio between the maximum block noise value $SUM_{MAX}$ and the phase error block noise value $SUM_{FE}$. The distance from the block boundary position BL2 to the '+' side, that is, to the right, is given by the following equation (5) and is taken as the phase error signal P2.

$$P2 = SUM_{MAX}/(SUM_{MAX} + SUM_{FE}) \quad \text{Equation (5)}$$

The block noise position $T_{BL}$ is given by the following calculation (Equation (6)) if the phase error signal P2 is considered.

$$T_{BL} = (T_{MAX} \cdot SUM_{MAX} + T_{FE} \cdot SUM_{FE})/(SUM_{MAX} + SUM_{FE}) \quad \text{Equation (6)}$$

Likewise, the block boundary position BL2 and phase error signal P2 are calculated based on the second maximum block noise value $SUM_{MAX2}$, the second phase error block noise value $SUM_{FE2}$, the third maximum block noise value $SUM_{MAX2}$ and the third phase error block noise value $SUM_{FE2}$. Specifically, the second block boundary detection circuit 9 detects three block boundaries at 10.67-pixel cycles from among the block noise values SUM 1 to SUM32 and calculates the block boundary position BL2 and phase error signal P2 for each of the three block boundaries. One resized boundary judgment value BD2 is also calculated. When BD2 is smaller than S2, BD2=0, and this BD2 is supplied to the comparator 10.

The comparator 10 compares the sizes of the no-resized boundary judgment value BD1 and the sized boundary judgment value BD2. When BD1 is greater than BD2, the comparator 10 sends to the selector 8 a select signal S that selects the block boundary position signal BL1 and the phase error signal P1 supplied by the first block boundary detection circuit 7. On the other hand, if BD2 is greater than BD1, the comparator 10 sends to the selector 8 a select signal S which selects the block boundary position signal BL2 and phase error signal P2 supplied by the second block boundary detection circuit 9. When BD1 and BD2 are both 'zero', it is determined that there is no block noise, and the removal section 200 outputs a noise-removed video signal without removing block noise.

The selector 8 selects the block boundary position signal BL1 or BL2 in accordance with the select signal S and supplies, the selected block boundary position signal BL to the removal section 200 as the block boundary position signal BL that represents final block boundary position. The selector 8 selects the phase error signal P1 or P2 in accordance with the select signal S and supplies the selected phase error signal P to the removal section 200 as the phase error signal P representing the final phase error. When both the first block boundary detection circuit 7 and second block boundary detection circuit 9 determine that a block boundary does not exist (that is, when the boundary judgment value BD1 is smaller than the predetermined threshold value S1 and the boundary judgment value BD2 is smaller than the predetermined threshold value S2), the removal section 200 outputs the input video signal as a noise-removed video signal without performing a block noise removal operation.

The operation of the detection section 100 with the above-described constitution will be explained for cases where the input video signal is a signal (digital or analog) that has not been resized and cases where the input video signal is a signal (digital or analog) that has undergone resizing.

(1) When the Input Video Signal is a Signal that has not Undergone Resizing

Figure 7A:
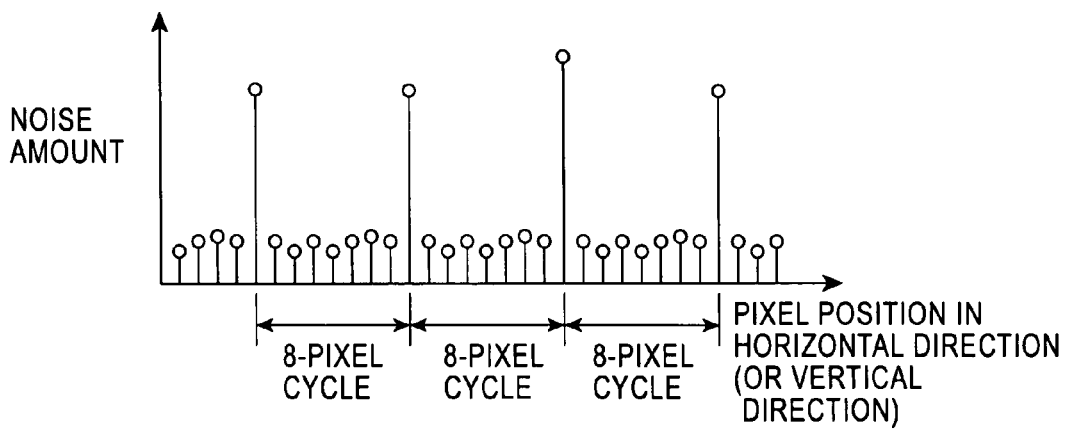
FIG. 7A to FIG. 7C illustrate the operation of the detection section of the block noise removal device shown in FIG. 2.

When block noise exists in the input video signal obtained by decoding the video signal which is compression-coded for each 8×8 pixel block, the noise peak appears every 8-pixel cycles as shown in FIG. 7A. Therefore, an interpixel differential value (ABS) for each pixel is first determined by the first-order derivation circuit 1, the median filter 2 and the differential absolute value calculation circuit 3. For each group of pixels as shown below the pixel disposed in the (8n-7)th position;
the pixel disposed in the (8n-6)th position;
the pixel disposed in the (8n-5)th position;
the pixel disposed in the (8n-4)th position;
the pixel disposed in the (8n-3)th position;
the pixel disposed in the (8n-2)th position;
the pixel disposed in the (8n-1)th position; and
the pixel disposed in the (8n)th position;
(where n is a natural number)

in the horizontal direction (or the vertical direction), block noise values SUME1 to SUME8 are generated as a result of the 32-pixel cycle accumulation circuit 4 and 8-pixel cycle convolution circuit 5 accumulating interpixel differential values that correspond with these pixels over one screen.

Figure 7B:
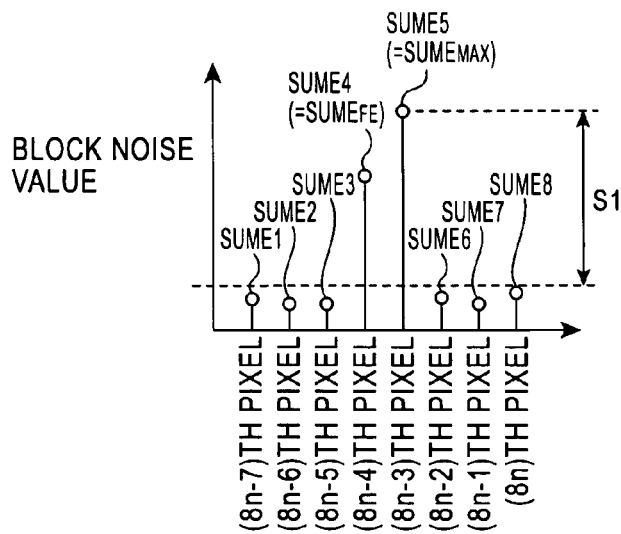

The first block boundary detection circuit 7 finds the maximum value ($SUME_{MAX}$) among the block noise values SUME1 to SUME8 and takes the larger of the block noise values SUME of the adjacent pixels on both sides of the pixel having the $SUME_{MAX}$ as the value ($SUME_{FE}$) of the phase error influence. For example, if the block noise values SUME1 to SUME8 for the eight groups of pixels arranged in the (8n-7)th to (8n) th positions respectively are in the state shown in FIG. 7B, the block noise value SUME5 is the $SUME_{MAX}$ and the block noise value SUME4 is the $SUME_{FE}$. When block noise exists, as shown in FIG. 7B, the SUME5, which is $SUME_{MAX}$, is greater than any other block noise values SUME except for SUME4 which is $SUME_{FE}$ by at least the predetermined threshold value S1. Therefore, the first block boundary detection circuit 7 calculates the difference between the $SUME_{MAX}$ and the largest SUME among the block noise values SUME1 to SUME8 except for the $SUME_{MAX}$ and $SUME_{FE}$, and takes this difference as the non-resized boundary judgment value (BD1). If this non-resized boundary judgment value BD1 is greater than the predetermined threshold value S1, the first block boundary detection circuit 7 judges that a block boundary exists. The first block boundary detection circuit 7 generates a block boundary position signal BL1 which represents pixel positions of every 8-pixel cycles starting from the pixel position having the $SUME_{MAX}$. For example, in the case of FIG. 7B, the first block boundary detection circuit 7 generates the block boundary position signal BL1 which represents the fact that the pixels having the block noise value SUME5, that is, the (8n-3)th pixel position is the block boundary position.

If the input video signal is an analog signal, the transition of the signal level at the block boundary is smooth and the block boundary positions is blurred. As a result, the detection of block boundary position is sometimes accompanied by a phase error. For example, as shown in FIG. 7B, the pixels adjacent to the pixel having the $SUME_{MAX}$ are affected by this phase error. Consequently, the block noise values SUME corresponding to the pixels adjacent on both sides to the pixel having the $SUME_{MAX}$ maximum values.

As already described above, the first block boundary detection circuit 7 takes as a phase error block noise value ($SUME_{FE}$) the larger from amongst the block noise values SUME of the pixels adjacent on both sides to the pixel having the maximum block noise value $SUME_{MAX}$. The pixel position having the maximum block noise value $SUME_{MAX}$ is taken as $TL_{MAX}$, the pixel position having the phase error block noise value $SUME_{FE}$ is taken as $TL_{FE}$, and the block noise position $TL_{BL}$ is represented by Formula (3) based on the ratio of $SUME_{MAX}$ to $SUME_{FE}$.

$$TL_{BL}=(TL_{MAX} \cdot SUME_{MAX}+TL_{FE} \cdot SUME_{FE})/(SUME_{MAX}+SUME_{FE})$$

When the phase error is absent, the pixel position $TL_{MAX}$ corresponding to the $SUME_{MAX}$ becomes the block boundary position signal BL1, as described above. However, when the phase error is present, a block boundary position signal BL1 is generated that indicates the pixel position on the left side from amongst the pixel position $TL_{MAX}$ and pixel position $TL_{FE}$ as the block boundary position. For example, in the case shown in FIG. 7B, the first block boundary detection circuit generates a block boundary position signal BL1 that indicates that the pixel corresponding to the block noise value SUME4, that is, the (8n-4)-th pixel position is the block boundary position. The block noise position $TL_{BL}$ assumes a position shifted by the phase error signal P1 to the "+" side, that is, to the right, with respect to boundary position signal BL1. The phase error signal P1 is represented by the distance obtained when the shift of one pixel is taken as "1". The phase error signal P1 is given by formula (1) or (2) as shown in FIG. 6A or 6B.

(2) The Case where the Input Video Signal is Subjected to Resizing

If block noise is present in the input video signal obtained by resizing the resolution of the video signal that is compression coded and decoded for each block (8×8 pixels) from [1440×1080 pixels] to [1920×1080 pixels], as shown in FIG.

Figure 7C:
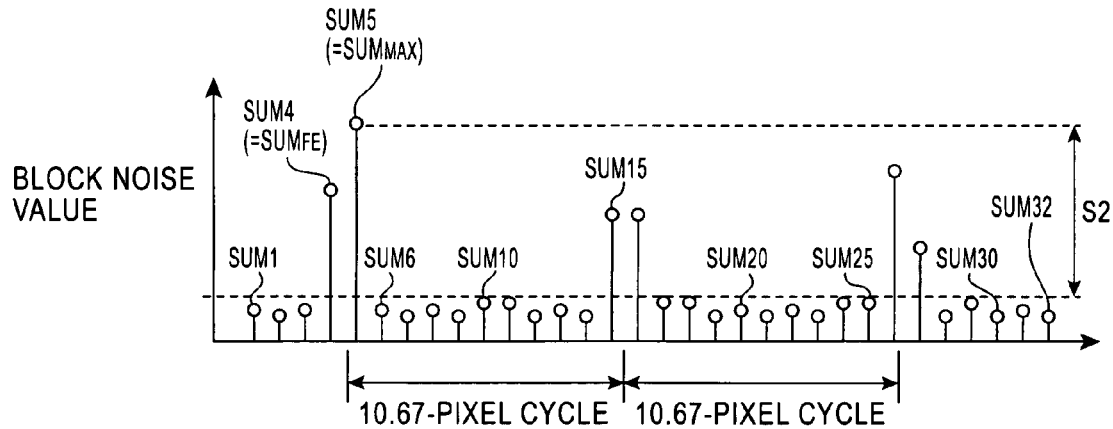

7C, the noise peak thereof is represented for each [(8×1920)/1440 pixel] period, that is, 10.67 pixel period. Accordingly, for each pixel of a pixel disposed in the (32n-31)-th position,
a pixel disposed in the (32n-30)-th position,
a pixel disposed in the (32n-29)-th position,
...
a pixel disposed in the (32n-1)-th position,
a pixel disposed in the (32n)-th position,
(where n is a natural number)

in the horizontal direction (or vertical direction), the second block boundary detection circuit 9 executes the following processing based on the block noise value SUM1 to SUM32 obtained by accumulating the unit block noise values ABS over one screen. First, the second block boundary detection circuit 9 determines a maximum value ($SUM_{MAX}$) from amongst the block noise values SUM1 to SUM32 and takes the larger from amongst the block noise values SUM of the pixels adjacent on both sides to the pixel having the $SUM_{MAX}$ as a phase error block noise value ($SUM_{FE}$). The second largest block noise value SUM and the third largest block noise value SUM are determined from amongst the block noise values SUM1 to SUM32 and they are taken as the second maximum block noise value $SUM_{MAX2}$ and the third maximum block noise value $SUM_{MAX3}$. The larger from amongst the block noise values SUM of the pixel position labels L adjacent on both sides to the pixel position label L allocated to the second maximum block noise value is taken as the second phase error block noise value $SUM_{FE2}$, and the larger from amongst the block noise values SUM of the pixel position labels L adjacent on both sides to the pixel position label L allocated to the third maximum block noise value is taken as third phase error block noise value $SUM_{FE3}$. For example, in the case shown in FIG. 7C, the block noise value SUM5 is the $SUM_{MAX}$, and the block noise value SUM4 is the $SUM_{FE}$. Likewise, the block noise value SUM26 becomes the $SUM_{MAX2}$, the block noise value SUM27 becomes the $SUME_{FE2}$, the block noise value SUM15 becomes the $SUM_{MAX3}$, and the block noise value SUM16 becomes the $SUME_{FE3}$. If block noise is present, a difference is found between the maximum block noise value $SUM_{MAX}$ and the maximum of the block noise values SUM1 to SUM32 from which the maximum block noise value $SUM_{MAX}$, second maximum block noise value $SUM_{MAX2}$, third maximum block noise value $SUM_{MAX3}$, phase error block noise value $SUM_{FE}$, second phase error block noise value $SUM_{FE2}$, and third phase error block noise value $SUM_{FE3}$ have been excluded, and this difference is supplied as a resized boundary determination value BD2 to the comparator 10. As shown in FIG. 7C, the block noise value SUM5 (i.e., $SUM_{MAX}$) is greater than all the block noise values SUM except the block noise values SUM26 (i.e., $SUM_{MAX2}$), SUM15 (i.e., $SUM_{MAX3}$), SUM4 (i.e., $SUM_{FE}$), SUM27 (i.e., $SUM_{FE2}$), and SUM16 (i.e., $SUM_{FE3}$) by the amount of the predetermined threshold S2 or more. Accordingly, the second block boundary detection circuit 9 determines whether the resized boundary determination value BD2 is larger than the predetermined threshold S2. When the resized boundary determination value BD2 is determined to be larger than the predetermined threshold S2, the second block boundary detection circuit 9 determines that the block boundary is present. The second block boundary detection circuit 9 then generates a block boundary position signal BL2 that indicates as a block boundary position the pixel position of each 10.67 pixel period taking as a reference a pixel position having the $SUM_{MAX}$. In other words, even if a video signal is compression coded and decoded for each 8×8 pixels, when resizing is performed from the resolution of [1440×1080 pixels] to [1920×1080 pixels], the following formula $$10.67.1 \approx (8 \times 1920)/1440$$

makes it possible to assume that the block boundary is appears for each 10.67-pixel period. Accordingly, each pixel position of each 10.67-pixel period taking as a reference the pixel position having the maximum value ($SUM_{MAXM}$) is determined as the block boundary position.

In the case shown in FIG. 7C, the second block boundary detection circuit 9 generates a block boundary position signal BL2 that indicates as a block boundary position each pixel position of each 10.67-pixel period taking as a reference the pixel having the block noise value SUM5, that is, the (32n-27)-th pixel position.

However, if the block period does not become an integer due to resizing, regardless of whether the input video signal is an analog signal or a digital signal, the block boundary position is blurred. As a result, the detection of block boundary position is sometimes accompanied by a phase error. At this time, for example, as shown in FIG. 7C, the pixels adjacent to the pixel having the $SUM_{MAX}$ are affected by this phase error. Consequently, the block noise values SUM of the pixels adjacent on both sides to the pixel having the $SUM_{MAX}$ assume large values. Accordingly, the second block boundary detection circuit 9, as described above, takes the larger value from amongst the block noise values SUM of the pixels adjacent on both sides to the pixel having the block noise value $SUM_{MAX}$ as a value ($SUM_{FE}$) affected by the phase error, and finds the phase error (P2) based on the ratio of this $SUM_{FE}$ to $SUM_{MAX}$. If a phase error is present, the left pixel position from amongst the pixel position $TL_{MAX}$ and pixel position $TL_{FE}$ is taken as the block boundary position signal BL1. This is similar to the case in which the input video signal is an analog signal that has not be subjected to resizing. When the phase error is present, the block noise position $TL_{BL}$ is given by Formula (3). The phase error signal P2 is given by formula (4) or (5).

As described above, the detection unit 100 includes the first block boundary detection circuit 7 that finds a block boundary position (BL1) and a phase error value (P1) with respect to an input video signal that has not been subjected to resolution resizing. The detection unit 100 also includes the second block boundary detection circuit 9 that finds a block boundary position (BL2) and a phase error value (P2) with respect to an input video signal that has been subjected to resizing. The first block boundary detection circuit 7 is separate from the second block boundary detection circuit 9. The non-resized boundary determination value (BD1) calculated by the first block boundary detection circuit 7 is compared with the resized boundary determination value (BD2) calculated by the second block boundary detection circuit 9, and the block boundary position and phase error value generated in the circuit (7 or 9) for which the larger value is obtained are taken as the final block boundary position (BL) and the final phase error value (P).

Thus, the difference between the block noise value ($SUME_{MAX}$, $SUM_{MAX}$) in the block boundary position and the block noise value in another pixel position is calculated as the boundary determination values (BD1, BD2) in each of the first and second block boundary detection circuits 7 and 9. When the BD1 is larger, it is determined that the input video signal has not been subjected to the resizing, and the block boundary position (BL1) and phase error value (P1) generated in the first block boundary detection circuit 7 are supplied to the removal unit 200. On the other hand, when the BD2 is larger, it is determined that the input video signal has been subjected to resizing, and the block boundary position (BL2) and phase error value (P2) generated in the second block boundary detection circuit 9 are supplied to the removal unit 200.

Therefore, with the detection unit 100, the detection of block noise is performed by the optimum processing method automatically corresponding to the mode (resized or non-resized) of the input video signal, even if no signal for identifying whether the input video signal has been resized or converted into an analog signal is supplied. When the input video signal has been resized or converted into an analog signal, and therefore a phase error has occurred in the input video signal, the detection unit 100 detects this error.

The removal unit 200 implements block noise removal processing with respect to the input video signal and generates the noise-removed video signal based on the block boundary position signal BL and phase error signal P supplied from the detection unit 100.

Figure 8:
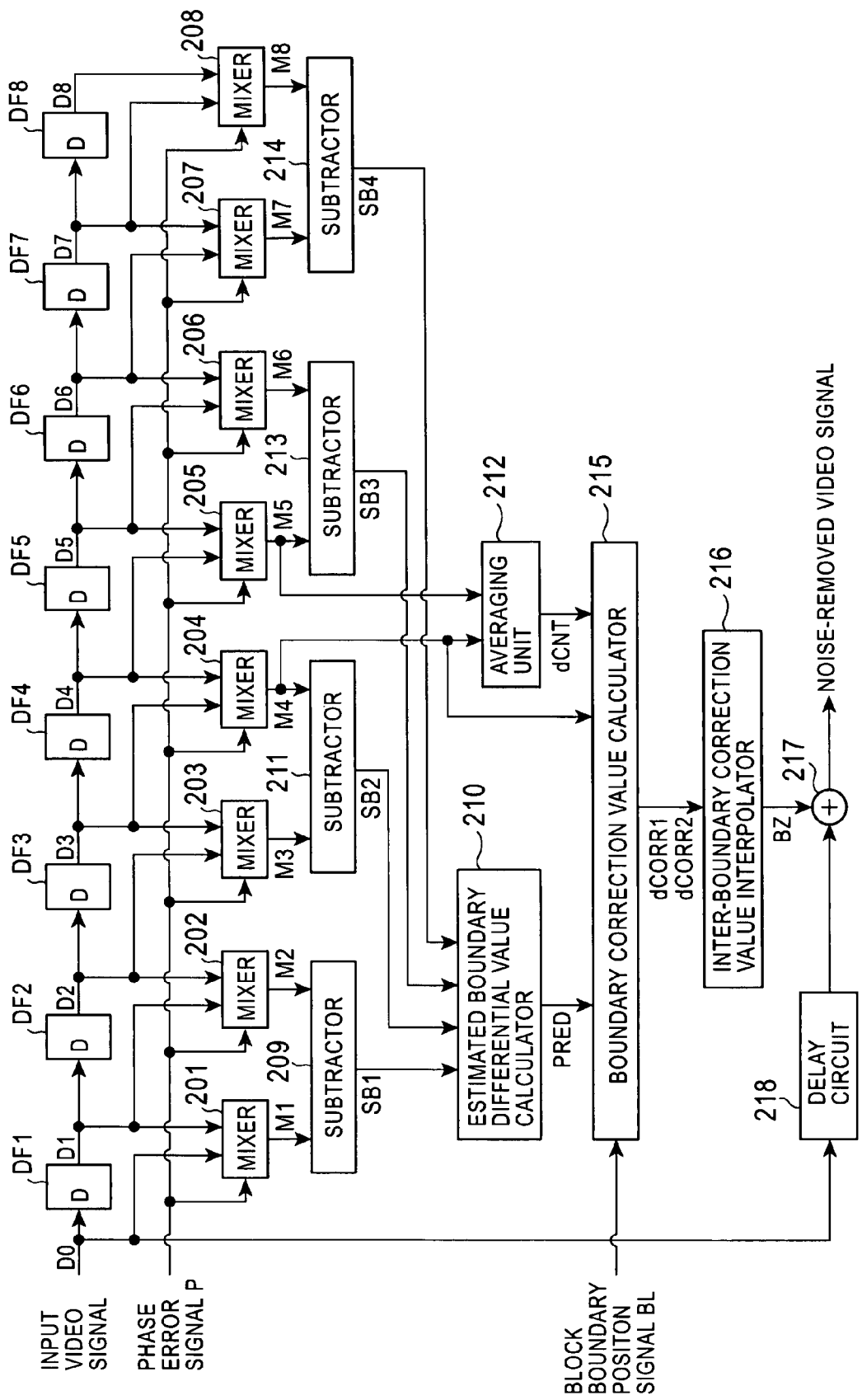
FIG. 8 shows the internal constitution of a removal section of the block noise removal device shown in FIG. 2.

FIG. 8 illustrates the internal configuration of the removal unit 200.

Referring to FIG. 8, a flip-flop DF1 successively receives an input video signal for respective pixels, delays it by a period of one pixel, and supplies the resultant as a pixel sample value D1 to a flip-flop DF2 and mixers 201 and 202. The flip-flop DF2 delays the pixel sample value D1 by a period of one pixel and supplies it as a pixel sample value D2 to a flip-flop DF3 and mixers 202 and 203. The flip-flop DF3 delays the pixel sample value D2 by a period of one pixel and supplies it as a pixel sample value D3 to a flip-flop DF4 and mixers 203 and 204. The flip-flop DF4 delays the pixel sample value D3 by a period of one pixel and supplies it as a pixel sample value D4 to a flip-flop DF5 and mixers 204 and 205. The flip-flop DF5 delays the pixel sample value D4 by a period of one pixel and supplies it as a pixel sample value D5 to a flip-flop DF6 and mixers 205 and 206. The flip-flop DF6 delays the pixel sample value D5 by a period of one pixel and supplies it as a pixel sample value D6 to a flip-flop DF7 and mixers 206 and 207. The flip-flop DF7 delays the pixel sample value D6 by a period of one pixel and supplies it as a pixel sample value D7 to a flip-flop DF8 and mixers 207 and 208. The flip-flop DF8 delays the pixel sample value D7 by a period of one pixel and supplies it as a pixel sample value D8 to a mixer 208.

The configuration shown in FIG. 8 is built on the assumption that a block boundary position is present between the pixel corresponding to the flip-flop DF4 and the pixel corresponding to the flip-flop DF5, or in the position of the pixel corresponding to the flip-flop DF4. When a phase error of sampling is present, the phase error is found from the surrounding differential values. The method for finding the phase error is described below.

The mixer 201 mixes the pixel sample value D1 and a pixel sample value in the input video signal that precedes the pixel sample value D1 by one pixel period (referred to hereinbelow as "pixel sample value D0") at the below-shown mixing ratios, so as to obtain a phase-corrected pixel sample value M1. The mixing ratio is decided by the phase error signal P. The mixer 201 supplies the phase-corrected pixel sample value M1 to a subtraction unit 209.

(A) When the pixel position $TL_{MAX}$ is to the left of the pixel position $TL_{FE}$ ($0 \leq P < 0.5$):

$$M1 = D1 \cdot (P-1) + D0 \cdot P$$

(B) When the pixel position $TL_{MAX}$ is to the right of the pixel position $TL_{FE}$ ($0.5 < P < 1$):

$$M1 = D0$$

Figure 9A:
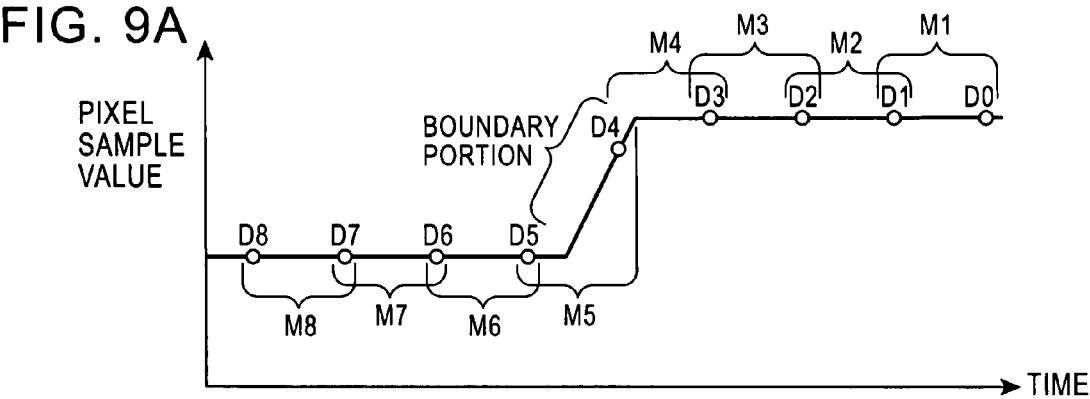
FIG. 9A to FIG. 9D illustrate the operation of mixers, subtractors, an assumed boundary differential value calculation circuit, an averaging circuit, and a boundary correction value calculation circuit that are shown in FIG. 8.
Figure 9B:
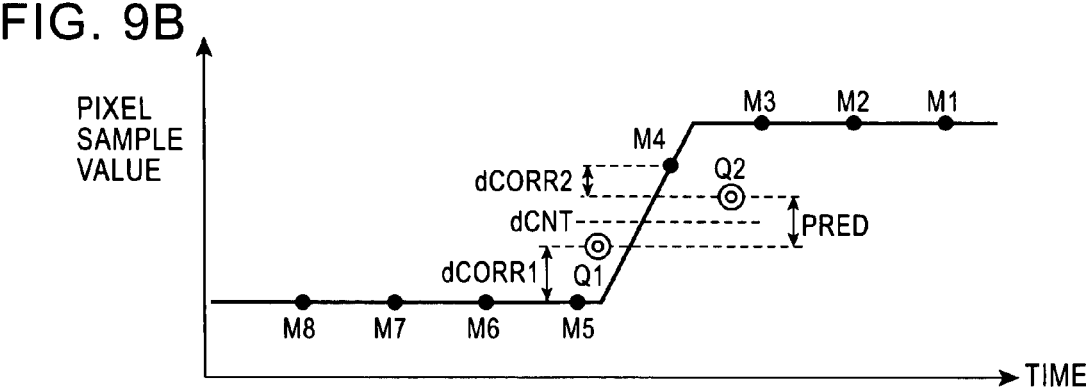
Figure 9C:
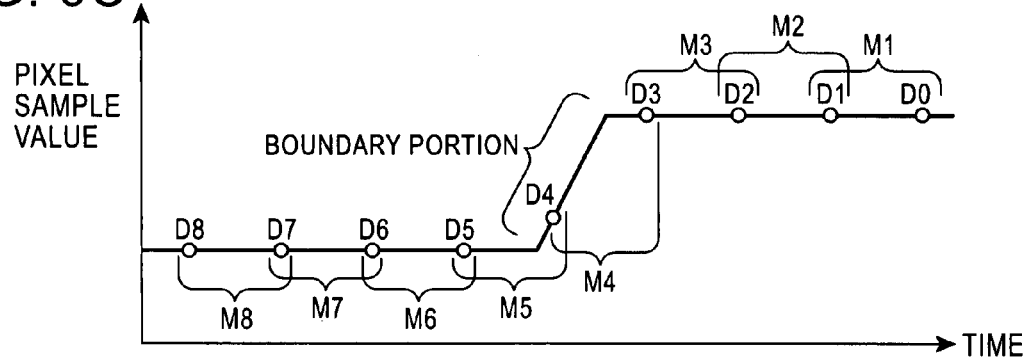

When M1 is found as shown in FIG. 9C, the position of M1 is to the right of the block boundary and has shifted in the direction (to the right) of withdrawing from the block boundary. Thus, no effect is produced by block distortions. Accordingly, M1=D0. The same is true hereinbelow.

The mixer 202 mixes the pixel sample values D1 and D2 at the below-indicated mixing ratios based on the phase error signal P, to obtain a phase-corrected pixel sample value M2. The mixer 202 then supplies the phase-corrected pixel sample value M2 to a subtraction unit 209.

(A) When the pixel position $TL_{MAX}$ is to the left of the pixel position $TL_{FE}$ ($0 \leq P < 0.5$):

$$M2 = D2 \cdot (P-1) + D1 \cdot P$$

(B) When the pixel position $TL_{MAX}$ is to the right of the pixel position $TL_{FE}$ ($0.5 < P < 1$):

$$M2 = D1$$

The subtraction unit 209 subtracts the phase-corrected pixel sample value M1 from the phase-corrected pixel sample value M2 and supplies the obtained subtraction result as a boundary peripheral differential value SB1 to an estimated boundary differential value computation circuit 210.

The mixer 203 mixes the pixel sample values D2 and D3 at the mixing ratios, which are decided by the phase error signal P, to obtain a phase-corrected pixel sample value M3, and supplies the phase-corrected pixel sample value M3 to a subtraction unit 211.

(A) When the pixel position $TL_{MAX}$ is to the left of the pixel position $TL_{FE}$ ($0 \leq P < 0.5$):

$$M3 = D3 \cdot (P-1) + D2 \cdot P$$

(B) When the pixel position $TL_{MAX}$ is to the right of the pixel position $TL_{FE}$ ($0.5 < P < 1$):

$$M3 = D2$$

The mixer 204 mixes the pixel sample values D3 and D4 at the mixing ratios based on the phase error signal P to obtain a phase-corrected pixel sample value M2, and supplies the phase-corrected pixel sample value M2 to the subtraction unit 211, an averaging circuit 212, and a boundary correction value computation circuit 215.

(A) When the pixel position $TL_{MAX}$ is to the left of the pixel position $TL_{FE}$ ($0 \leq P < 0.5$):

$$M4 = D4 \cdot (P-1) + D3 \cdot P$$

(B) When the pixel position $TL_{MAX}$ is to the right of the pixel position $TL_{FE}$ ($0.5 < P < 1$):

$$M4 = D3$$

The subtraction unit 211 subtracts the phase-corrected pixel sample value M3 from the phase-corrected pixel sample value M4 and supplies the obtained subtraction result as a boundary peripheral differential value SB2 to the estimated boundary differential value computation circuit 210.

The mixer 205 mixes the pixel sample values D4 and D5 at the below-described mixing ratios based on the phase error signal P to obtain a phase-corrected pixel sample value M5, and supplies the phase-corrected pixel sample value M5 to the averaging circuit 212 and a subtraction unit 213.

(A) When the pixel position $TL_{MAX}$ is to the left of the pixel position $TL_{FE}$ ($0 \leq P < 0.5$):

$$M5 = D5$$

When M5 is found as shown in FIG. 9A, the position of M5 is to the left of the block boundary and has shifted in the direction (to the left) of withdrawing from the block boundary. Thus, no effect is produced by block distortion. Accordingly, M5=D5. The same is true hereinbelow.

(B) When the pixel position $TL_{MAX}$ is to the right of the pixel position $TL_{FE}$ (0.5<P<1):

$$M5=D5 \cdot P + D4 \cdot (P-1)$$

The mixer 206 mixes the pixel sample values D5 and D6 at the mixing ratios based on the phase error signal P to obtain a phase-corrected pixel sample value M6, and supplies the phase-corrected pixel sample value M6 to the subtraction unit 213.

(A) When the pixel position $TL_{MAX}$ is to the left of the pixel position $TL_{FE}$ (0≦P<0.5):

$$M6=D6$$

(B) When the pixel position $TL_{MAX}$ is to the right of the pixel position $TL_{FE}$ (0.5<P<1):

$$M6=D6 \cdot P + D5 \cdot (P-1)$$

The subtraction unit 213 subtracts the phase-corrected pixel sample value M5 from the phase-corrected pixel sample value M6 and supplies the obtained subtraction result as a boundary peripheral differential value SB3 to the estimated boundary differential value computation circuit 210.

The mixer 207 mixes the pixel sample values D6 and D7 at the below-described mixing ratios based on the phase error signal P to obtain a phase-corrected pixel sample value M7, and supplies the phase-corrected pixel sample value M7 to the subtraction unit 214.

(A) When the pixel position $TL_{MAX}$ is to the left of the pixel position $TL_{FE}$ (0≦P<0.5):

$$M7=D7$$

(B) When the pixel position $TL_{MAX}$ is to the right of the pixel position $TL_{FE}$ (0.5<P<1):

$$M7=D7 \cdot P + D6 \cdot (P-1)$$

The mixer 208 mixes the pixel sample values D7 and D8 at the below-described mixing ratios based on the phase error signal P to obtain a phase-corrected pixel sample value M8, and supplies the phase-corrected pixel sample value M8 to the subtraction unit 214.

(A) When the pixel position $TL_{MAX}$ is to the left of the pixel position $TL_{FE}$ (0≦P<0.5):

$$M8=D8$$

(B) When the pixel position $TL_{MAX}$ is to the right of the pixel position $TL_{FE}$ (0.5<P<1):

$$M8=D8 \cdot P + D7 \cdot (P-1)$$

The subtraction unit 214 subtracts the phase-corrected pixel sample value M7 from the phase-corrected pixel sample value M8 and supplies the obtained subtraction result as a boundary peripheral differential value SB4 to the estimation boundary differential value computation circuit 210.

The estimation boundary differential value computation circuit 210 finds an interpixel differential value at the block boundary section that can be taken as a differential value of adjacent pixels in the block boundary portion after the block noise removal processing. For this purpose, the estimation boundary differential value computation circuit 210 performs the below-described interpolation computations based on the boundary peripheral differential values SB1 to SB4. Then, the estimation boundary differential value computation circuit 210 supplies the interpixel differential value as a block boundary portion estimation differential value PRED to the boundary correction value computation circuit 215.

$$PRED=\{3 \cdot (SB2+SB3)-(SB1+SB4)\}/4$$

The averaging circuit 212 calculates an average value of the phase-corrected pixel sample value M4, which is obtained by mixing the pixel sample values D4 and D3 immediately after the block boundary position, and the phase-corrected pixel sample value M5, which is obtained by mixing the pixel sample values D5 and D6 immediately before the block boundary position. The averaging circuit 212 supplies this average value as a central value dCNT in the block boundary portion to the boundary correction value computation circuit 215.

The boundary correction value computation circuit 215 generates a block boundary correction value dCORR2 to the pixel sample value immediately after the block boundary position and another block boundary correction value dCORR1 to the pixel sample value immediately before the block boundary position. For this purpose, the boundary correction value computation circuit 215 performs the following computations based on the phase-corrected pixel sample value M4, block boundary portion estimation differential value PRED, and central value dCNT. Then, the boundary correction value computation circuit 215 supplies the block boundary correction values dCORR2 and dCORR1 to an interboundary correction value interpolation circuit 216.

$$dCORR1=\{dCNT-(PRED/2)\}-M5$$

$$dCORR2=-\{dCNT+(PRED/2)\}+M4$$

The computation of the block boundary correction values dCORR1 and dCORR2 is based on the assumption that a block boundary position is present between the pixel corresponding to the flip-flop circuit DF4 and the pixel corresponding to the flip-flop circuit DF5 in FIG. 8, or in the position of the pixel corresponding to the flip-flop circuit DF4. A block boundary position signal BL is introduced to the boundary correction value computation circuit 215. When the block boundary position arrives at a zone between the pixel corresponding to the flip-flop circuit DF4 and the pixel corresponding to the flip-flop circuit DF5 or in the position of the pixel corresponding to the flip-flop circuit DF4, the boundary correction value computation circuit 215 supplies the block boundary correction values dCORR1 and dCORR2 to the interboundary correction value interpolation circuit 216.

The interboundary correction value interpolation circuit 216 generates a block correction signal BZ indicating the level correction amount corresponding to each pixel position in the block, that is, between the block boundaries, by performing linear interpolation based on the block boundary correction values dCORR1 and dCORR2 generated in each of the block boundary portions of the consecutive blocks. Thus, the interboundary correction value interpolation circuit 216 generates a block correction signal BZ indicating the level correction amount corresponding to each pixel position in the block by performing for each block the linear interpolation based on the block boundary correction value dCORR2 (or dCORR1) generated in the left boundary portion of the block and the block boundary correction value dCORR1 (or dCORR2) generated in the right boundary portion of the block. The interboundary correction value interpolation circuit 216 supplies the block correction signal BZ to the addition unit 217. It should be noted that if a block boundary position signal BL with a constant 0 level representing a state in which no block boundary is present is supplied, the interboundary correction value interpolation circuit 216 supplies the block correction signal BZ representing a correction value 0 to the addition device 217.

A delay circuit 218 supplies the input video signal to the addition unit 217 with a delay corresponding to a total processing time of the flip-flops DF1 to DF8, mixers 201 to 208, subtraction units 209, 211, 213, 214, estimation boundary differential value computation circuit 210, averaging circuit 212, boundary correction value computation circuit 215, and interboundary correction value interpolation circuit 216.

The addition unit 217 adds the block correction signal BZ to the level of the input video signal that is delayed by the delay circuit 218, and generates a noise-removed video signal which has a moderated noise (abrupt level transition) in the block boundary portion.

The operation of the removal unit 200 will be explained when the input video signal shown in FIG. 9A and FIG. 9C is supplied. FIG. 9A and FIG. 9B show a case where the pixel position $TL_{MAX}$ is on the left side of the pixel position $TL_{FE}$ ($0 \leq P < 0.5$) and FIG. 9C and FIG. 9D show a case where the pixel position TL is on the right side of the pixel position $TL_{FE}$ ($0.5 < P < 1$).

FIG. 9A and FIG. 9C show a consecutive-9-pixel-worth of input video signal in the vicinity of the block boundary portion. The flip-flops DF1 to DF8 shown in FIG. 8 respectively generate pixel sample values D1 to D8 indicated by the white circles in FIG. 9A and FIG. 9C. The value of the input video signal supplied to the flip-flop DF1 at this point in time is the pixel sample value D0 in FIG. 9A and FIG. 9C.

Figure 9D:
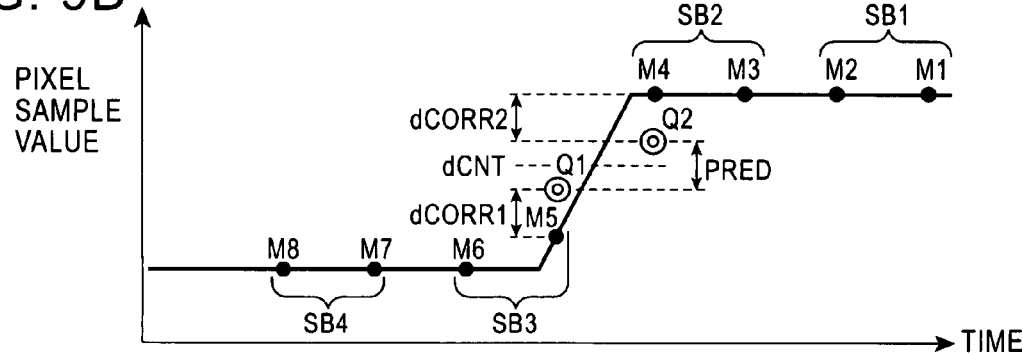

First, a sequence of phase-corrected pixel sample values M1 to M8 as shown in FIG. 9B and FIG. 9D is generated by mixing each two adjacent pixel sample values of the pixel sample values D0 to D8 at a mixing ratio decided by the phase error signal P supplied from the detection unit 100.

As shown in FIG. 9B and FIG. 9D, the difference between the phase-corrected pixel sample values M5 and M6 immediately before the block boundary position is taken as the boundary peripheral differential value SB3, and the difference between the phase-corrected pixel sample values M3 and M4 immediately after the block boundary position is taken as the boundary peripheral differential value SB2. Then, as shown in FIG. 9B and FIG. 9D, the difference between the phase-corrected pixel sample values M1 and M2 immediately after the phase-corrected pixel sample values M3 and M4 is taken as the boundary peripheral differential value SB1, and the difference between the phase-corrected pixel sample values M7 and M8 immediately before the phase-corrected pixel sample values M5 and M6 is taken as the boundary peripheral differential value SB4.

The estimation boundary differential value computation circuit 210 performs the above-described interpolation computation based on the boundary peripheral differential value SB1 to SB4 so as to calculate, as a block boundary portion estimation differential value PRED, the differential value between a pixel sample value Q1 after the block noise removal processing of the phase-corrected pixel sample value M4 in the block boundary portion (FIG. 9B and FIG. 9D) and a pixel sample value Q2 after the block noise removal processing of the phase-corrected pixel sample value M5 in the block boundary portion.

The boundary correction value computation circuit 215, first, calculates one of the pixel sample values Q1 and Q2 (FIG. 9B and FIG. 9D), for example Q1, in the below-described manner based on the central value dCNT in the phase-corrected pixel sample values M4 and M5 in the block boundary portion and the block boundary portion estimation differential value PRED.

$Q1 = \{dCNT - (PRED/2)\}$

Then, the boundary correction value computation circuit 215 generates the block boundary correction value dCORR1 for the phase-corrected pixel sample values M5 by subtracting the phase-corrected pixel sample value M5 from the pixel sample value Q1, as shown in FIG. 9B and FIG. 9D. The boundary correction value computation circuit 215 inverts the polarity of the block boundary correction value dCORR1 and issues the resultant value as the block boundary correction value dCORR2 for the phase-corrected pixel sample values M4 as shown in FIG. 9B and FIG. 9D.

The interboundary correction value interpolation circuit 216 generates for each block a block correction signal BZ indicating the level correction amount corresponding to each pixel position in the block by performing linear interpolation based on the block boundary correction value dCORR generated in the left boundary portion of the block and the block boundary correction value dCORR generated in the right boundary portion of the block. For example, when an input video signal is supplied that has a level transition indicated by the thick solid line in FIG. 10A, the interboundary correction value interpolation circuit 216 generates a block correction signal BZ indicating the level correction amount corresponding to each pixel position in the block II, as shown by the thick solid line in FIG. 10B, by performing linear interpolation based on the block boundary correction value dCORR2 generated in the boundary portion of the blocks I and II and the block boundary correction value dCORR1 generated in the boundary portion of the blocks II and III.

Therefore, by subjecting an input video signal to the level correction based on the block correction signal BZ, a noise-removed video signal, as indicated by the thick broken line in FIG. 10A, from which block noise has been removed without degrading the image quality, can be obtained, even if the video signal as indicated by the thick solid line in FIG. 10A in which the difference in level between the adjacent blocks is large is entered.

This application is based on Japanese Patent Application No. 2006-114833 filed on Apr. 18, 2006 and the entire disclosure thereof is incorporated herein by reference.

What is claimed is:

1. A block noise removal device for removing block noise from within a decoded video signal obtained by encoding and decoding an input video signal for each pixel block having a plurality of pixels, the block noise removal device comprising:

an interpixel differential value calculator for calculating, as an interpixel differential value, a differential value between each two adjacent pixels in a frame of the decoded video signal;

an accumulation unit for classifying, into separate pixel groups, the interpixel differential values by using a block size N (where N is an integer) of the decoded video signal or by using M which is an integer multiple of the block size N, and accumulating the interpixel differential values of the pixels disposed in the respective nth position (where n is 1 to N or 1 to M) in the respective pixel groups, thereby obtaining first to Nth block noise values or first to Mth block noise values;

a block boundary detector for detecting the largest block noise value among the first to Nth block noise values or the first to Mth block noise values to generate a block boundary position signal that represents the pixel position having the largest block noise value in the pixel group, and detecting, as a phase error block noise value, the larger of the block noise values of the adjacent pixels on both sides of the pixel having the largest block noise value, so as to generate a phase error signal on the basis of a ratio between the phase error block noise value and the largest block noise value;

a phase correction unit for obtaining a phase correction pixel sample value that is produced by performing phase correction processing based on the phase error signal on the decoded video signal; and a signal output unit for generating a noise-removed video signal by performing block noise removal processing on the basis of the phase correction pixel sample value.

2. The block noise removal device according to claim 1, wherein a correction position of the block noise is between a position of the largest block noise value and a position of the phase error block noise value, and is decided by a ratio between the phase error block noise value and the largest block noise value.

3. The block noise removal device according to claim 1, further comprising a unit block noise detection unit for detecting a center value of each m consecutive interpixel differential values and calculating, as a unit block noise value, the difference between the center value and the interpixel differential value associated with the center value, wherein the accumulation unit uses the unit block noise values instead of the interpixel differential values to obtain the first to Nth block noise values or the first to Mth block noise values.

4. A block noise removal device for removing block noise from within a decoded video signal obtained by encoding and decoding an input video signal for each pixel block having a plurality of pixels, the block noise removal device comprising:

an interpixel differential value calculator for calculating, as an interpixel differential value, a differential value between each two adjacent pixels in a frame of the decoded video signal;

an accumulation unit for classifying, into separate pixel groups, the interpixel differential values by using M which is an integer multiple of a block size N (where N is an integer) of the decoded video signal and a resized block size L estimated from the decoded video signal, and accumulating the interpixel differential values of the pixels disposed in the respective nth position (where n is 1 to M) in the respective pixel groups, thereby obtaining first to Mth block noise values;

a cycle judgment unit for determining whether the cycle of the consecutive first to Mth block noise values is N or L;

a block boundary detector for detecting the largest block noise value among the first to Nth block noise values or the first to Mth block noise values to generate a block boundary position signal that represents the pixel position having the largest block noise value in the pixel group, and detecting, as a phase error block noise value, the larger of the block noise values of the adjacent pixels on both sides of the pixel having the largest block noise value, so as to generate a phase error signal on the basis of a ratio between the phase error block noise value and the largest block noise value;

a phase correction unit for obtaining a phase correction pixel sample value that is produced by performing phase correction processing based on the phase error signal on the decoded video signal; and a signal output unit for generating a noise-removed video signal by performing block noise removal processing on the basis of the phase correction pixel sample value and the cycle detected by the cycle judgment unit.

5. The block noise removal device according to claim 4, wherein the correction position of the block noise is between a position of the largest block noise value and a position of the phase error block noise value and decided by a ratio between the phase error block noise value and the largest block noise value.

6. The block noise removal device according to claim 4 further comprising a center value detector for detecting a center value of each m consecutive interpixel differential values and calculating, as a unit block noise value, the difference between the center value and the interpixel differential value associated with the center value, wherein the accumulation unit uses the unit block noise values instead of the interpixel differential values to obtain the first to Mth block noise values.

7. A block noise removal device that removes block noise from within a decoded video signal of N (horizontal direction) pixels×N (vertical direction) pixels obtained by encoding and decoding an input video signal for each pixel block having a plurality of pixels or from within a resized decoded video signal obtained by resizing resolution of the decoded video signal using a factor of Q, the block noise removal device comprising:

an interpixel differential value calculator for calculating, as an interpixel differential value, a differential value between each two adjacent pixels in a frame of the decoded video signal or the resized decoded video signal;

an accumulation unit for classifying pixels of one screen into separate pixel groups, each pixel group having M continuous pixels (M is a common multiple of N·Q and N) in a horizontal direction or a vertical direction, and accumulating the unit block noise values of the pixels disposed in the respective nth position (where n is 1 to M) in the respective pixel groups, thereby obtaining first to Mth block noise values;

a convolution unit for cyclically allocating first to Nth labels to the first to Mth block noise values in order of the first to Mth block noise values and accumulating the block noise values to which the same labels have been allocated, thereby obtaining first to Nth convolution block noise values;

a first block boundary detector for detecting the largest convolution block noise value among the first to Nth convolution block noise values to generate a first block boundary position signal that represents the pixel position having the largest convolution block noise value, and detecting, as a phase error convolution block noise value, the larger of the convolution block noise values of the adjacent pixels on both sides of the pixel having the largest convolution block noise value to generate a first phase error signal on the basis of a ratio between the phase error convolution block noise value and the largest convolution block noise value;

a second block boundary detector for detecting the largest block noise value among the first to Mth block noise values to generate a second block boundary position signal that represents the pixel position having the largest block noise value, and detecting, as a phase error block noise value, the larger of the block noise values of the adjacent pixels on both sides of the pixel having the largest block noise value to generate a second phase error signal on the basis of a ratio between the phase error block noise value and the largest block noise value;

a selector for selecting one of the first phase error signal and the second phase error signal to issue the selected phase error signal as a phase error signal, and for selecting one of the first block boundary position signal and the second block boundary position signal to issue the selected block boundary position signal as a block boundary position signal; and a signal output unit for generating a noise-removed video signal by performing block noise removal processing on the basis of the block boundary position signal on the decoded video signal or the resized decoded video signal after performing phase correction processing on the basis of the phase error signal on the decoded video signal or the resized decoded video signal.

8. The block noise removal device according to claim 7, wherein the selector comprises:

- a first unit for calculating the difference between the largest convolution block noise value and the convolution block noise value which is the largest among the first to Nth convolution block noise values except for the largest convolution block noise value and the phase error convolution block noise value, thereby generating a first boundary judgment value;
- a second unit for calculating the difference between the largest block noise value and the block noise value which is the largest among the first to Mth block noise values except for the largest block noise value, the phase error block noise value, a next largest block noise values disposed in each resizing cycle starting from the position of the largest block noise value, and a next largest phase error block noise which is the larger of the block noise values of the adjacent pixels on both sides of the pixel having the next largest block noise value, thereby generating a second boundary judgment value; and
- a third unit for selecting the first phase error signal and the first block boundary position signal when the first boundary judgment value is greater than the second boundary judgment value to generate the first phase error signal and the first block boundary position signal as the phase error signal and the block boundary position signal, and for selecting the second phase error signal and the second block boundary position signal when the second boundary judgment value is greater than the first boundary judgment value to generate the second phase error signal and the second block boundary position signal as the phase error signal and the block boundary position signal.

* * * * *